United States Patent

[11] 3,609,707

| [72] | Inventors | Jordan D. Lewis<br>Worthington;<br>Albert H. Adelman, Columbus, both of Ohio |
|------|-----------|---|
| [21] | Appl. No. | 782,321 |
| [22] | Filed | Dec. 9, 1968 |
| [45] | Patented | Sept. 28, 1971 |
| [73] | Assignee | Battelle Development Corporation<br>Columbus, Ohio |

[54] METHOD AND APPARATUS FOR GENERATING THREE-DIMENSIONAL PATTERNS
43 Claims, 18 Drawing Figs.

[52] U.S. Cl. ............................................. 340/173 CC,
340/173 LS, 350/160 P
[51] Int. Cl. .................................................. G11c 13/04,
G02b 1/00
[50] Field of Search .......................................... 340/173,
173 CC; 350/160 P

[56] References Cited
UNITED STATES PATENTS
| 3,253,497 | 5/1966 | Dreyer | 340/173 UX |
| 3,123,711 | 3/1964 | Fajans | 340/173 X |
| 3,219,993 | 11/1965 | Schwertz | 350/160 X |
| 3,440,621 | 4/1969 | Knapp | 340/173 X |
| 3,454,414 | 7/1969 | Andes | 350/160 X |

FOREIGN PATENTS
| 1,103,861 | 2/1968 | Great Britain | 340/173 |

Primary Examiner—Terrell W. Fears
Assistant Examiner—Stuart Hecker
Attorney—Sughrue, Rothwell, Mion, Zinn & Macpeak ABSTRACT: Method and apparatus for generating patterns in a three-dimensional volume of material having at least two discernible nonradiation emissive states and responsive to a selected level of radiant energy, such as heat or light, to pass between the discernible states. According to one aspect of the invention, external radiation sources with distinct wavelength ranges are utilized to cause the material to pass from one discernible state to another in preselected regions of the volume. According to another aspect of the invention, materials used have a sharp threshold between their two discernible states wherein a single external radiation source of one range of wavelengths may have its intensity focused in preselected regions of the volume.

PATENTED SEP 28 1971

METHOD AND APPARATUS FOR GENERATING THREE-DIMENSIONAL PATTERNS

BACKGROUND OF THE INVENTION

This invention relates generally to three-dimensional pattern generation devices and, more specifically, to improvements in radiation responsive three-dimensional display devices.

It is often desired to have a display in three dimensions of some object or condition. For instance, the location of bodies in space, such as aircraft in close proximity to an airport, may be usefully displayed in a small device to show their relative position and thus aid in air traffic control. Another application is as a three-dimensional computer output display which renders a computer more useful as a design tool.

Devices for displaying some object or condition in three dimensions are known. For example, one such three-dimensional display device utilizes a normally transparent volume of material which is excited at some predetermined location by a radiation source to emit light. A single point may be scanned throughout the material to form a three-dimensional display. An example of such a device is disclosed in U.S. Pat. No. 3,123,711 to J. Fajans. There, the display device includes a volume of material which requires an electromagnetic radiation beam on one specific wavelength to raise a selected portion of the material from its ground energy level to an intermediate energy level. Application of a second beam, having a second specific wavelength, raises the material from its intermediate energy level to a higher energy level at the juncture where the two beams intersect. The material at this higher energy level drops back to a lower level and emits visible radiation while doing so.

Although a system such as described in the foregoing Fajans patent is practical for some applications, it does have certain undesirable limitations. This system must have two beams of electromagnetic energy each having a distinct wavelength which depends upon the energy level structure of the material irradiated. This further requires that the useful energy in each beam be concentrated in a narrow spectral region surrounding each distinct wavelength. Furthermore, to obtain a visible light output in such system, large quantities of electromagnetic energy are required in the intersecting beams. Finally, as in all luminescent, visible light output will continue for only a short time after the radiation is removed.

Another type of three-dimensional display device is disclosed in U.S. Pat. No. 3,399,993, to K. Agnew. There, the display device includes a volume of material which is normally clear below a threshold temperature and is responsive to heating in preselected regions by the application of two or more beams of radiation which intersect at the preselected regions to raise the temperature above the threshold and thus bring about an optically discernible change.

Although a system such as described in the foregoing Agnew patent is practical in some aspects, it does have certain undesirable limitations. This system utilizes two beams of electromagnetic energy which intersect at a region whereupon an optical change is desired. This requirement of intersecting two beams can be difficult, especially when a figure is desired to be drawn wherein a plurality of regions are to be heated successively. Furthermore, there is some darkening in the volume of material along the path of the electromagnetic energy beams from entering the volume until reaching the selected region, which causes undesirable visual interference with the display. Also, this undesired darkening outside the predetermined regions along the beam paths may increase absorption of intensity of radiation so that insufficient energy may reach the preselected location to bring about desired darkening for certain types of radiation sensitive materials.

Therefore, it is a primary object of this invention to provide an improved pattern generation device.

Another object of this invention is to provide a radiation responsive device which enables the production of a visible optical change in response to a wide range of electromagnetic radiation wavelengths.

It is also an object of this invention to provide improved techniques of three-dimensional pattern generation which enable the use of a wide selection of operable materials as the three-dimensional medium.

A further object of this invention is to provide improved three-dimensional pattern generation devices which allow retention of a scanned image for a substantial length of time.

Yet another object of this invention is to provide an improved radiation-excited three-dimensional pattern generation device in which discernible changes may be brought about by lower levels of radiation.

An additional object of this invention is to provide an improved three-dimensional pattern generation device wherein a single beam of radiation may be utilized which affects the desired pattern generation within a volume of material.

Also, it is an object of this invention to provide improved three-dimensional pattern generation devices in which discernible changes are brought about within a volume of material at a preselected region without substantial change outside of said region.

Still a further object of this invention is to provide an improved three-dimensional pattern generation device with utility as an improved three-dimensional display device.

SUMMARY OF INVENTION

These and other objects may be realized in accordance with this invention in one aspect thereof by providing a three-dimensional pattern generating system including a volume of material having at least two discernible states, and responsive to radiation intensity within at least two distinct ranges of wavelengths, application of intensity of one of the wavelength ranges causing the material to pass from one to another discernible state and application of intensity of the other range of wavelengths causing the material to pass from the other back to the one discernible state. Pattern generating means are cooperatively associated with said volume of material for applying thereto radiation within both distinct wavelength ranges simultaneously to effect a change in discernible state only at a preselected region within said volume. In a specific form of the invention, radiation of said one wavelength range is directed, at a given instant, into the volume to the preselected region; and simultaneously to other regions of the volume through which this radiation passes, radiation within the other wavelength range is applied to maintain said other regions in said one state for eliminating undesirable confusion with the desired discernible change at the preselected region or for controlling said other regions attenuation of said one range of wavelengths, or both.

A volume of material preferred for use is characterized by at least two discernible nonemissive states. As used herein, the expression "nonemissive state" defines the "passive" property or characteristic of the material to either absorb, reflect, refract or scatter radiation, such as light, for example. A discernible change in a nonemissive state of the material thus manifests itself in a change in the degree in which the material either absorbs, reflects, refracts or scatters readout radiation which is applied to detect the change. Such preferred materials may undergo changes in their emissive properties between states, provided, however, that the emission characteristics of the material are of a sufficiently low magnitude so as not to obscure the desired change in the passive state of the material to the extent that such change cannot be discerned. Generally, it is preferred to utilize materials which are either fully nonemissive, or whose emission characteristics are of a low order.

According to a preferred form of the invention, the material used is characterized by at least two discernible, nonemissive optical states, which material is responsive to radiation intensity within at least two distinct ranges of wavelengths, application of radiation intensity within one range of wavelengths causing the material to pass from one to the other of said optical states and application of intensity within the other range of wavelengths causing the material to pass from said other of said states back to said one state. As used herein, the term "nonemissive optical state" defines the property of the material to absorb, reflect, refract or scatter electromagnetic radiation within the visible, ultraviolet and infrared ranges which is applied to detect said optical change.

Such an optical material useful in the practice of the invention is a photoreversible photochromic material which is characterized by at least two discernible nonemissive optical states and which is responsive to at least two wavelength ranges of electromagnetic radiation within the visible, ultraviolet and infrared range.

For use as a display device, such a photochromic material is chosen to have a first optical state which is substantially transparent to light radiation and a second optical state which is strongly absorptive of certain light wavelengths (a particular color or colors) to create a discernible change which is detectable to the observer by application of readout light radiation. The distinct radiation wavelength range to which the material is responsive to pass from its substantially transparent optical state to the absorptive or darkened optical state may be termed a darkening radiation and the distinct range of wavelengths which causes the material to pass from its darkened optical state back into its transparent optical state may be termed a bleaching radiation. In a specific form of the invention, a beam of darkening radiation is directed into a volume of transparent photochromic material toward a preselected location wherein a darkened spot is desired to be formed. Bleaching radiation is applied to the regions within the volume through which the darkening radiation passes before reaching the preselected location. To form a figure with this apparatus, the darkening and bleaching radiation beams are scanned cooperatively throughout the volume of material so as to form a series of such darkened spots. When these spots are formed coadjacently, for example, a three-dimensional line drawing may be constructed.

According to another aspect of this invention, a material having at least two discernible optical states and which is responsive to temperature to pass from one optical state to another is preferable for use as a display system. A thermochromic material is utilized which has a sharp threshold temperature below which the volume is optically clear and above which exhibits a discernible change in phase. Electromagnetic radiation is directed into the material to a preselected location to cause the temperature of that location to rise above its threshold and exhibit a discernible change. A single beam of electromagnetic energy is used to cause the selective change in optical state, said beam is focused in a manner that the intensity density of the beam increases through the thermochromic material to a maximum at the preselected location in the presence of attenuation of the radiation.

A preferred thermochromic material is additionally characterized by a hysteresis effect wherein the temperature at which the spot again becomes transparent in state is lower than the threshold temperature of the material, thereby allowing an increased retention time of a spot, or series of spots forming a figure, which is displayed in the material.

While the scope of the invention is defined in the appended claims, this invention may be best understood by reference to the following description of the preferred embodiments taken in conjunction with the accompany drawings.

DESCRIPTION OF THE PREFERRED EMBODIMENTS

The three-dimensional pattern generator of this invention is responsive to radiation. Radiation may be defined as propagating energy. The particular form of the energy may be, for example, particle radiation, such as an electron beam, or electromagnetic radiation, such as light, or acoustic radiation, such as sonic energy. It is possible to practice this invention with a wide variety of radiation forms, the volume of material being chosen for a particular pattern generator to be responsive to the radiation type used to generate a change in state which is discernible.

Figure 1:
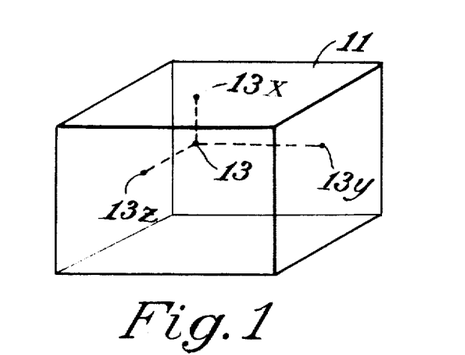
FIGS. 1 and 1A illustrate possible three-dimensional displays which may be constructed according to the techniques of this invention.

A preferred form of the pattern generator of this invention is a three-dimensional display system utilizing electromagnetic radiation in tee optical region (visible, infrared and ultraviolet wavelength regions). A visibly discernible display is illustrated in FIG. 1 wherein a darkened spot 13 is written within a volume of normally transparent material 11 by means of external electromagnetic radiation sources. The position of the spot 13, denoted by its coordinate projections $13x$, $13y$, and $13z$ displays useful information since it may be viewed three-dimensionally.

Figure 1A:
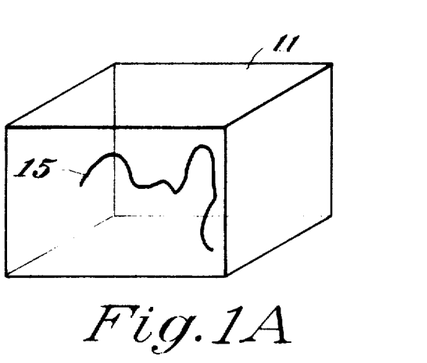

Another possible application of a display device according to the present invention is illustrated in FIG. 1A where a series of spots are written together to draw a line 15 by external radiation means. This line is viewed in full three-dimensions. In both of these examples of display devices, the volume of material 11 is chosen to be substantially optically clear throughout, except at the point 13 or the line 15, which is in an optical state distinct from that of the surrounding medium.

Figure 2:
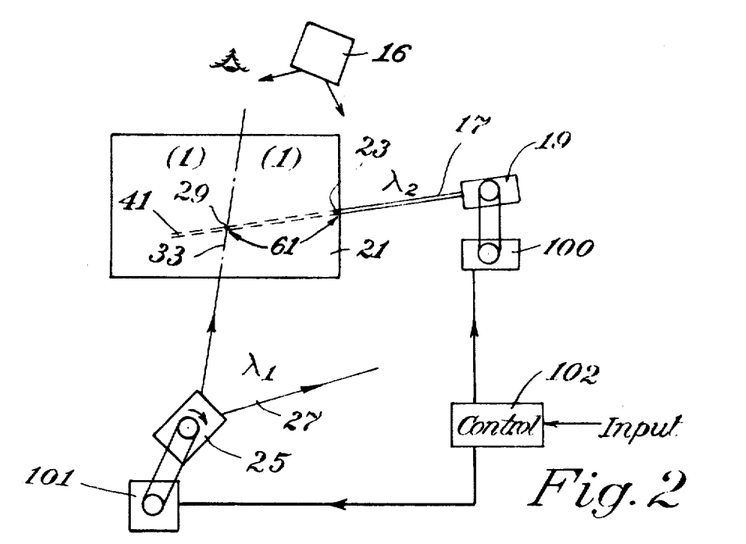
FIGS. 2 and 2A illustrate an aspect of the present invention utilizing a photochromic three-dimensional medium.

Referring to FIG. 2, a three-dimensional system for writing a spot within a volume of photochromic material is illustrated by way of a two-dimensional schematic diagram for clarity. The photochromic material is chosen to be one that is normally clear. Electromagnetic radiation of an appropriate wavelength range for the particular material used is directed at a preselected location 29 to change the optical state of the location within the normally transparent volume into a colored state, thus forming the desired spot. This change in the optical state is primarily a change in light absorption of the spot which may be detected by an observer with the aid of a low intensity readout light source 16 illuminating the volume of material in a manner to make the change in optical state of the spot discernible to a suitable detector, such as an observer, without itself causing discernible changes in optical state in the volume of material. The readout light is generally ambient room light.

In the following discussion of photochromic materials appropriate for the preferred embodiments of this invention, a material used will have at least two spectral absorptive states which are designated for convenience as color states (1) and (2) which are visibly discernible one from The other. Further, such a material has the capability of passing from one color state to another upon application of appropriate electromagnetic radiation. Throughout this description, stimulating electromagnetic radiation having wavelengths in a range about $\lambda_1$ will be considered that which will switch the spectral characteristics of the volume of photochromic material from its color state (1) to its color state (2). A second electromagnetic radiation wavelength range about $\lambda_1$ is designated as that radiation which will switch the volume of material from its color state (2) back to the color state (1). It should be noted, as is more fully discussed hereinafter, that the radiation which is effective to switch a normal photochromic material between colored states is not limited to single specific wavelength since a wide wavelength range is generally operable.

In a display device according to this invention, it is generally desirable that one of the two color states be transparent to at least a portion of the visible light wavelength range of electromagnetic radiation. "Transparent" or "clear" as used herein, is defined to mean there is substantially no attenuation of radiation within a wavelength region which includes the range of wavelengths employed as readout radiation. Therefore, it has been made a convention throughout this discussion that the color state (1) of the photochromic material is transparent while the color state (2) absorbs at least one range of wavelengths within the visible spectrum, this appearing to have a color distinct from the surrounding medium.

Referring to FIG. 2, narrow collimated beam of light 17 having wavelengths in a band which includes $\lambda_2$ emanates from a light source 19. A volume of photochromic material 21 initially in its color state (1) is irradiated by the beam 17. A spot 23 of the color state (2) will be formed at the surface of the photochromic material 21 where the radiation beam 17 enters the volume. This spot will attenuate the radiation of wavelength range about $\lambda_2$ when the photochromic material has spectral characteristics similar to that shown in FIG. 2A. In order to provide a three-dimensional display device, some technique is necessary to prevent the spot 23 from forming so that the radiation beam 17 may penetrate the volume of material to the preselected location 29 within. This is accomplished by using a bleaching radiation source 25 which emits a broad beam 27 of radiation in a band of wavelengths that includes $\lambda_1$ but excludes $\lambda_2$ which will maintain the point 23 and the entire beam path 61 in a transparent color state (1) and thereby prevent attenuation of the beam 17 and allow it to proceed to some point further within the photochromic material 21 where writing is desired. As soon as the beam 17 passes without the area affected by the bleaching radiation 27, the spot 29 will be formed. This spot is the photochromic material in its color state (2) which will contrast visually with the surrounding transparent color state (1) of the material.

The bleaching radiation 27 need only be applied along the portion 61 of the beam 17 and may be limited to portions of the material 21 necessary for accomplishing this limited flooding to reduce unnecessary radiation absorption and thus reduce unwanted temperature rise of the volume of material. However, it may be desirable that the bleaching radiation source 25, or some independent source, be capable of flooding the volume with bleaching radiation of sufficient intensity to erase a prior pattern before constructing a new pattern.

With this apparatus, the technique of writing a line, curve, spot, series of line segments or plurality of spots within the photochromic material, is to sweep an edge 33 of the radiation beam 27 from left to right through the photochromic material 21 while the radiation source 19 is pivoting in three-dimensions to define successive spots within the material where writing will occur at a given instant. It is the intersection of the left edge 33 of the beam 27 with the narrow light beam 17 that defines at any given moment the spot within the volume where writing will occur. Therefore, the edge 33 of the beam 27 should be made as sharp as possible in intensity cutoff. Throughout a cycle of sweeping the beam 27 through the volume 21, the radiation beam 17 is modulated in intensity if it is desired to write line segments or a plurality of spots instead of a continuous line.

Figure 2A:
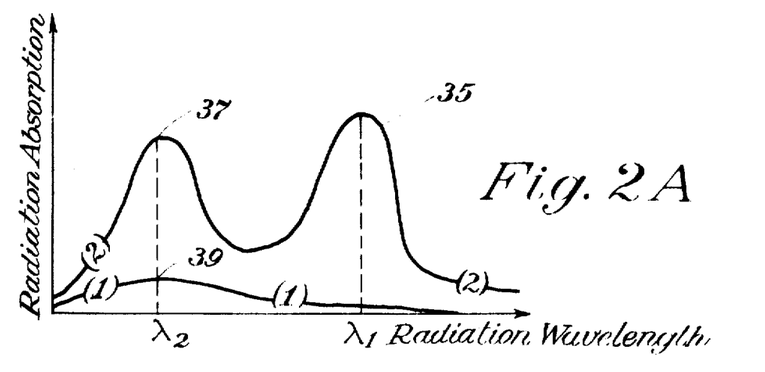

FIG. 2A illustrates spectral characteristic curves of a photochromic material which is suitable for use in the apparatus described with respect to FIG. 2. The lower curve illustrates the radiation absorption of the material in arbitrary units as a function of the radiation wavelength applied thereto when the photochromic material is in its color state (1), (substantially transparent). The upper curve shows radiation absorption of the material as a function of applied radiation wavelength when the material is in its color state (2), (darkened). At the left end of the wavelength scale are the invisible wavelengths at the ultraviolet end of the visible electromagnetic radiation spectrum. Therefore, the radiation wavelength band about $\lambda_2$ is chosen to be strongly absorbed by the photochromic material in its color state (1), thereby to switch the material into its color state (2). When this happens, the spot of the material so switched will exhibit a visible color due to the absorbing peak 35 somewhere in the visible region of electromagnetic radiation. Bleaching radiation with a wavelength band about $\lambda_1$ is then chosen within the peak 35 so that it is strongly absorbed to switch such an irradiated volume back to its transparent color state (1).

An absorption peak 37 is that characteristic of the material that allows the spot 29 to be formed. It is preferably to have this peak as high as possible so that the collimated radiation beam 17 will produce a sharp spot 29. If the radiation absorption peak 37 is not substantial, the collimated beam 17 will not be absorbed by a small spot 29 but will form a tail along the volume 41 until enough material in the color state (2) is formed to completely absorb the intensity of the collimated beam 17. Furthermore, the material should have its absorption characteristic curve for color state (1) to radiation of wavelength range about $\lambda_2$ fairly low at point 39, so that there will not be excessive attenuation of the radiation beam 17 along a path 61 before reaching the spot 29 desired to be written.

It should be noted that the color state (1) and (2) characteristic curves referred to throughout this discussion are the two saturation states of a photochromic material utilized since these are generally the preferred operating states. There may be other spectral absorption states in-between these two saturation states. The degree of color change depends upon the amount of light absorbed and the efficiency of conversion from one color state to the other.

Figure 3:
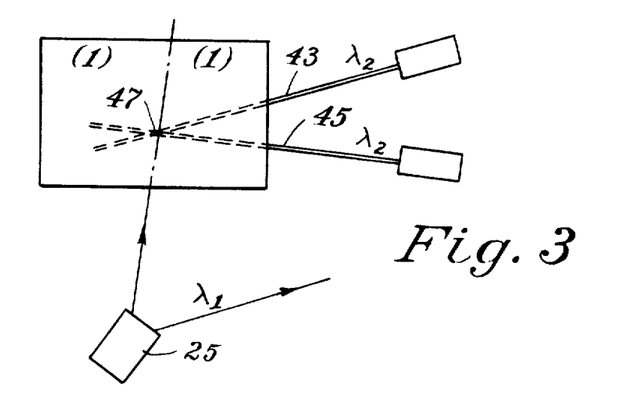
FIGS. 3, 3A and 3B illustrate other embodiments of the present invention utilizing photochromic materials.

If the difference in absorption between peaks 37 and 39 at the radiation wavelength $\lambda_2$ is not approximately two times as great or more, color contrast between undesired darkening in the volume 41 of FIG. 2 and the desired written spot 29 may not be great enough for a satisfactory display. If such a material is used, the degree of this undesirable darkening can be reduced by concentrating more energy at the spot 29 than in the volume 41 such as by using two or more writing beams of lower intensity each, as illustrated in FIG. 3. The narrow collimated light beams 43 and 45 must always be directed to intersect at a desired writing point 47 within the photochromic material. Otherwise, a technique as schematically illustrated in FIG. 3 is the same as that illustrated with respect to FIG. 2.

Figure 3A:
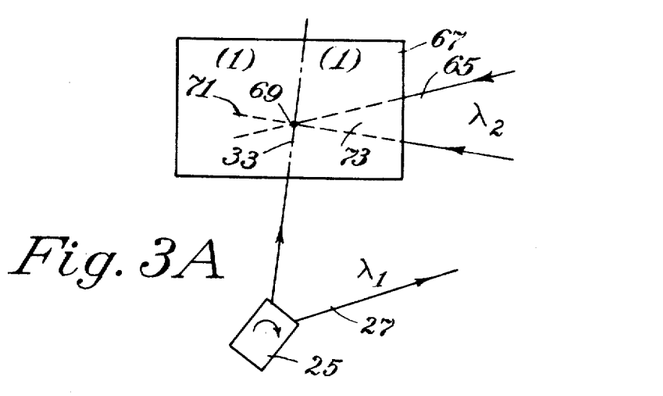
Figure 3B:
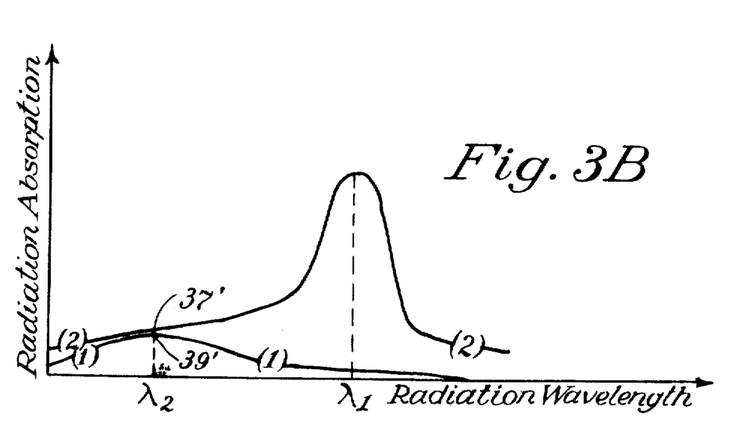

Another technique for reducing such undesirable darkening when the difference in absorption between peaks 37 and 39 of FIG. 2A is not great, is shown in FIG. 3A. Here, a focused beam is employed to increase the darkening radiation intensity at the writing spot 69. FIG. 3B illustrates the spectral characteristics of a photochromic material with substantially no difference in color state (2) absorption of radiation wavelengths about $\lambda_2$ and color state (1) absorption (points 37' and 39'). If such a material were used in the display device of FIG. 2, there would be strong darkening in the area 41 for a substantial distance behind the desired spot 29. Therefore, the system of FIG. 2 is modified by reference to FIG. 3A where a focused beam 65 of radiation with a wavelength range about $\lambda_2$ is brought to a focus at the spot 69 within the photochromic material 67 where a discernible darkening is desired. Although there may be some darkening in the volume 71 behind the spot 69 it will be significantly less than that in the volume 41 of FIG. 2 if the photochromic material of FIG. 3B is used in both systems. The beam 65 is focused in a manner that its intensity density increases along the beam in the volume 73 upon entry into the photochromic material 67 up to the focused spot 69. Energy losses due to absorption in the volume 73 of the beam are not of such concern as the absorption in volume 61 in the system of FIG. 2 because of the focused beam. It should also be noted that the bleaching radiation beam 27 is desired to keep the volume 73 of the stimulating beam 65 in its color state (1) to remove any visual interference but is not necessary for forming the spot 69 if material of FIG. 3B is used. The bleaching radiation of a wavelength range about $\lambda_1$ is not necessary in the device of FIG. 3A to control the absorption of the volume 73 to the stimulating radiation wavelength range about $\lambda_2$ since such absorption is substantially the same in both color states for the material of FIG. 3B (peaks 37' and 39').

Figure 4:
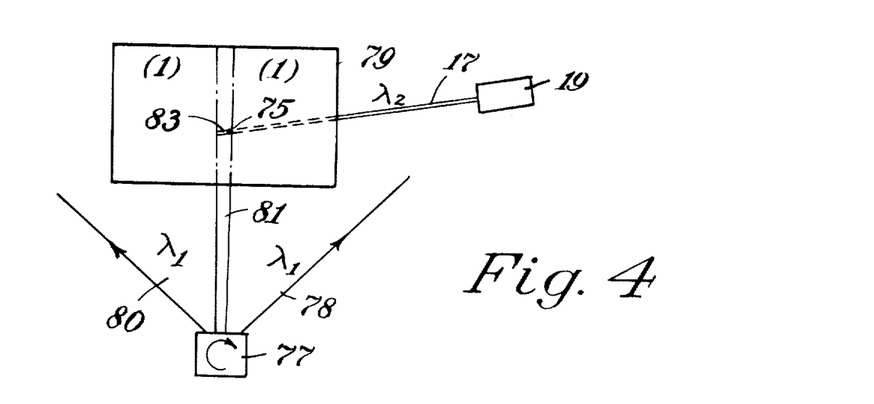
FIG. 4 illustrates still another embodiment of the present invention in its photochromic form.

Referring to FIG. 4, a display apparatus is illustrated which is similar to that shown in FIG. 2, except that a bleaching radiation of a wavelength range about $\lambda_1$ is additionally applied to the volume of material beyond a desired written spot 75. This system will eliminate in part any undesirable darkening behind the written spot 75 that results if the photochromic material used has characteristics similar to that of FIG. 2A with the exception that the absorption points 37 and 39 are not sufficiently separated, the extreme shown in FIG. 3B. A bleaching radiation source 77 is given movement so as to sweep the bleaching radiation beam segments 78 and 80 across the volume of photochromic material 79 from left to right. The beam has a section 81 which is absent of radiation, so will allow a darkening radiation beam 17 to write the desired spot 75 which will include any undesirable darkening in the volume 83 behind the spot 75 only in the width of the radiation free section 81. It can be seen that as the bleaching radiation sweeps from left to right and a spot or line segment is written, it will be erased by the bleaching radiation beam segment 80 which trails the radiation free section 81. Therefore, this system will not produce a persistent figure, but may be sued by repetitive scanning at a high rate to draw a figure which appears to the human eye to persist. In certain applications, a temporary display is desired and the system as illustrated in FIG. 4 will be useful for that application whether the photochromic material exhibits characteristics as illustrated in FIG. 2A or FIG. 3B, or anywhere in-between.

Figure 5:
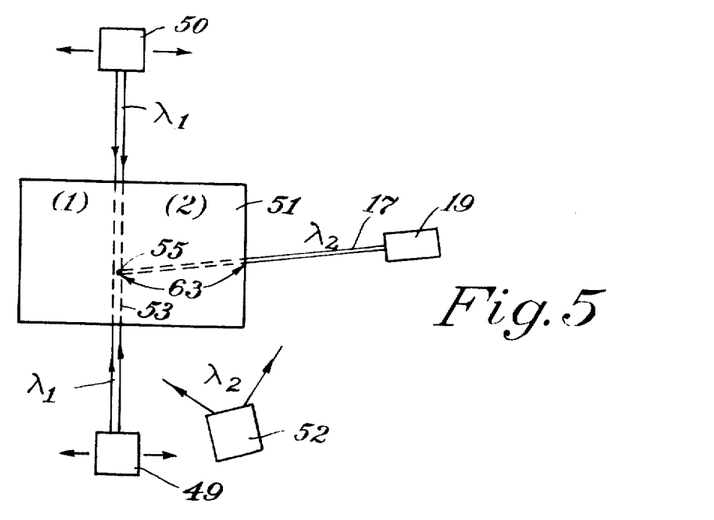
FIGS. 5, 5A and 5B schematically illustrate yet another embodiment of the present invention in its photochromic form.

Another embodiment of the present invention which uses photochromic materials in a three-dimensional volume is illustrated in FIG. 5. The light source 19 emits the narrow collimated beam 17 with range of wavelengths about $\lambda_2$ as in the embodiment of FIG. 2. Here, however, the volume of photochromic material 51 is placed initially in its color state (2) by a radiation source 52 which means the volume is dark prior to writing a point, rather than transparent as in the technique of FIG. 2. When the entire volume 51 is in color state (2), the source 52 is turned off and bleaching radiation sources 49 and 50 are moved so that edge 53 of sharp intensity change within the volume of photochromic material scan from left to right. The radiation sources 49 and 50 contain a source with a range of wavelengths about $\lambda_1$ which is responsible for bleaching the volume of material 51 into its transparent color state (1). However, the material will not be bleached in the regions which are simultaneously flooded by the narrow collimated beam 17 of the wavelength range about $\lambda_2$ so long as the intensity of the light beam 17 is sufficient. Shown FIG. 5 is the construction of a single dark spot 55 within the volume 51 for simplicity in understanding the invention. If a written spot is to be viewed prior to the remaining portions of the volume of material 51 being switched to its transparent color state (1), it should be viewed from a direction without a dark background.

Figure 5A:
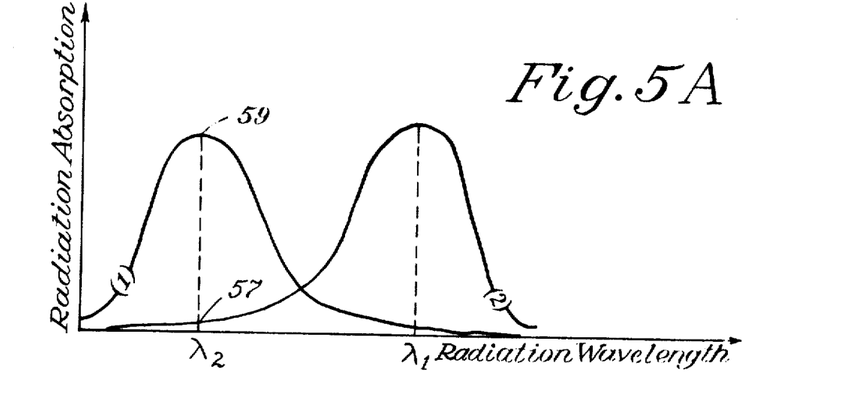

A photochromic material preferred in the embodiment of FIG. 5 should have the radiation absorption characteristics similar to those shown in FIG. 5A. The writing radiation of a wavelength range about $\lambda_2$ in the narrow beam 17 is chosen to be highly absorbed by the photochromic material in its transparent color state (1) which will then switch it to its color state (2) in the volumes so irradiated. Bleaching radiation is chosen at a wavelength range about $\lambda_1$ which will be strongly absorbed by the material in its color state (2) resulting in a switching to its transparent state (1). In place of the narrow beam 17, a focused beam as described hereinabove may be used, or two beams may be caused to cross at the spot 55, or some other arrangement.

Such a photochromic material in combination with the configuration of FIG. 5 has certain advantages for some applications over the configurations shown in FIGS. 2, 3, 3A and 4. Since the material 51 initially penetrated by the darkening radiation beam 17 of a wavelength range about $\lambda_2$ is in its color state (2), absorption of this radiation is at a very low level, as can be seen by point 57 of FIG. 5A. This will result in low loss of radiation of the beam 17 prior to transmission to the desired writing spot 55, without a need for bleaching radiation as employed in FIG. 2, and still have a high absorption by the material in its color state (1) as indicated by the point 59 in FIG. 5A. This high absorption by the material in color state (1) provides for formation of a desired spot 55 with a low intensity of the radiation beam 17.

Also necessary in the display system of FIG. 2 is that The photochromic material along the beam 17 prior to reaching the desired spot 29 (beam length 61) is subject to radiation of both wavelengths ranges about $\lambda_1$ and $\lambda_2$ which compete with each other to cause a constant switching of that volume of material along the radiation beam from one state to the other and then back again. Certain types of photochromic materials will fatigue as a result of this constant color state reversal which destroys capability of the material to switch between states for a prolonged period. Such photochromic materials chemically break down because of this constant switching. In the display device of FIG. 5, however, this portion of the beam 17 (beam length 63) is subjected only to radiation of the wavelength range about $\lambda_2$, so there is no competition between the stimulating and bleaching radiation in these volumes. This improvement is claimed in a copending application by A. W. Adamson filed simultaneously herewith.

It may be noted from discussion hereinabove and with reference to the curves of FIGS. 2A, 3B and 5A that the usable radiant energy employed is not confined to a very narrow spectral region as with the active system of the aforementioned U.S. Pat. No. 3,123,711, 2 may be a broad range around $\lambda_1$ or $\lambda_2$. Photochromic materials have been found to have gently changing radiation absorption characteristics as a function of wavelength as exemplified by these curves. This desirable characteristic allows flexibility in choosing radiation sources.

A matrix, the physical environment of the photochromic material, must be chosen with several factors considered. It must not absorb excessive electromagnetic energy to avoid losses and excessive heating. It should be sufficiently rigid to prevent the deleterious effects of thermal convection currents and vibration.

The photochromic materials hereinabove discussed may be described as doubly photochromic or photoreversible; that is, they have two spectral absorptive states and are capable of being switched from one state to another and back again by the use of appropriate light radiation. Such materials for use in the embodiments of the invention described hereinabove preferably exhibit little or no decay from one color state to the other absent deliberate application of appropriate electromagnetic energy. However, most photochromic materials exhibit some decay due to surrounding heat and light. Therefore, photochromic material for a specific system must be chosen with a desired persistence time.

In order to write a plurality of spots within the three-dimensions volume, the radiation sources are scanned appropriately. For instance, referring to FIG. 2, the light source 19 (darkening radiation) may be driven by an appropriate motor source 100 through belt and pulley arrangements. Similarly, the bleaching radiation source 25 may be rotated about some pivot by a second independent motor source 101. Scanning of both the stimulating and bleaching radiation may be controlled by an appropriate electrical circuit 102 which receives input signals representative of the series of slots or figure which is desired to be drawn within the volume of material.

Similar scanning systems may be added to the other configurations described.

Figure 5B:
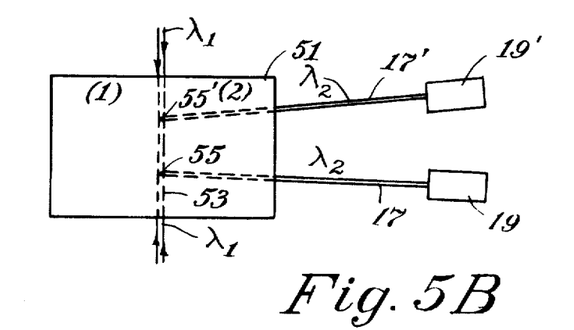

It should also be noted that although the specific arrangements hereinabove described are for writing a single spot within a volume of material at any given instance of time, additional radiation sources may be added to any of these arrangements in order to write more than one spot at a time. With reference to FIG. 5B, for example, the display system of FIG. 5 has an additional darkening radiation source 19' which directs a beam 17' of radiation about the wavelength $\lambda_2$ to intersect the edge 53 of the bleaching radiation sheet at the preselected spot 55'. As the bleaching radiation is scanned across the volume 51 from left to right, darkened spots 55 and 55' will remain.

Also, in the arrangement of FIG. 2, a second stimulating radiation source emitting a wavelength range about $\lambda_2$ may intersect the sharp edge 33 of the bleaching radiation beam 27 to form some second spot in addition to the spot 29 shown.

Figure 6:
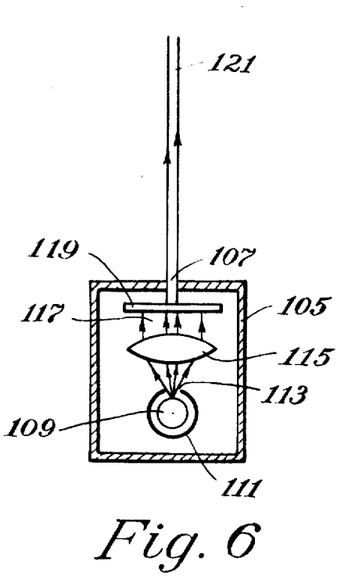
FIGS. 6 and 6A show typical radiation sources for practicing the present invention.
Figure 6A:
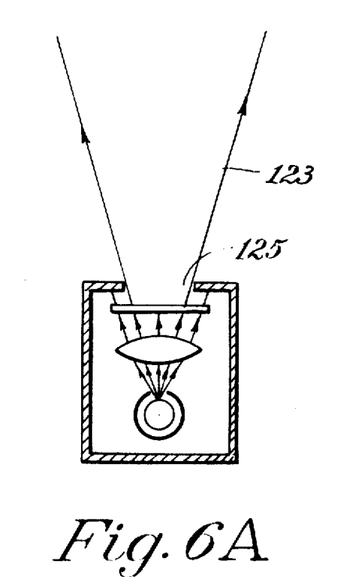
Figure 6B:
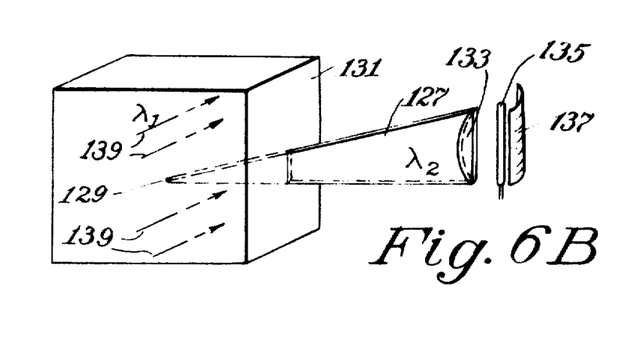
FIG. 6B illustrates a preferred technique for focusing a beam of radiation into a volume of photochromic material.

The radiation sources used in the practice of this invention may consist of standard optical elements and certain configurations are illustrated in FIGS. 6 and 6A and 6B. In FIG. 6, a source which could be used as a source 19 in the specific arrangements hereinabove described is shown. A case 105 having a small aperture 107 encloses a light source 109 which is itself surrounded by a reflector 111 which has an opening 113 that is either a round hole or a narrow elongated slit, depending upon the application. A lens 115 forms a collimated beam 117 which is passed through a color filter 119. The portion of the collimated beam will pass through the opening 107 to form a narrow collimated beam 121.

FIG. 6A shows a similar arrangement as in FIG. 6 with appropriate modifications to obtain a diverging beam 123 which would be suitable for use as the radiation sources 25 or 52 in the specific arrangements described hereinabove. An opening 125 in the light source case is made larger than that in FIG. 6 and the lens either has different optical characteristics or is the same lens placed closer to the light source to obtain the diverging beam. It may be preferable to use a cylindrical lens.

Referring to FIG. 6B, a preferred light source for forming a focused beam for sue in the embodiment illustrated with respect to FIG. 3A, is shown. A wedge-shaped beam 17 of darkening radiation (wavelengths in a range about $\lambda_2$) is focused to its maximum intensity at the location 129 at which a darkened spot (optical state (2) ) is to be formed in the otherwise transparent (optical state (1) volume of photochromic material 131. A cylindrical lens 133 focuses the light radiation from some appropriate line source 135 and reflector 137. The cylindrical lens 133 is made thin so that, with the aid of appropriate opaque masks (not shown), the beam 127 will converge to a focus in one dimension and be substantially collimated in a direction perpendicular thereto. The lradiation 139 (wavelengths in a range about $\lambda_1$) are directed to the volume of material 131 to pass through the thin dimension of beam 127, as shown in FIG. 6A. This configuration allows an efficient use of bleaching radiation 139 to penetrate and bleach those portions of the volume of material 131 through which the beam 127 passes.

Figures 7, 7A, 8:
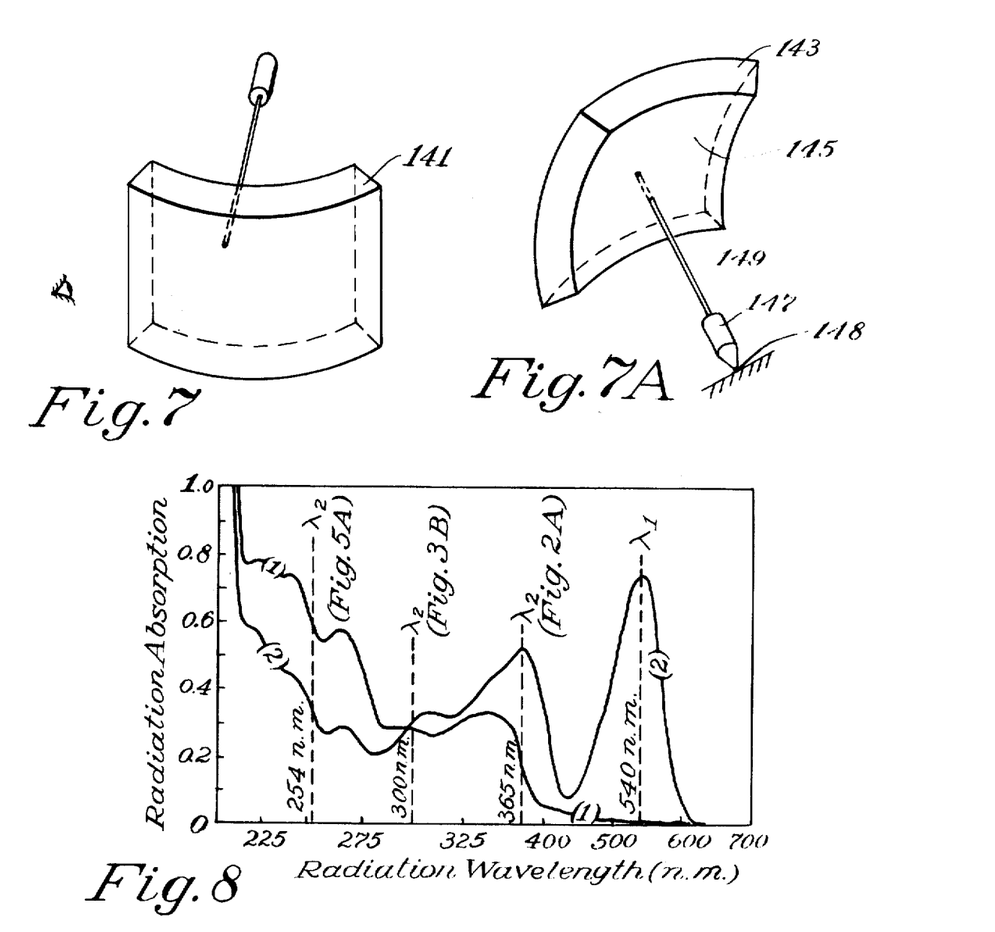
FIGS. 7 and 7A show display systems having curved volumes of photochromic material.
FIG. 8 illustrates radiation absorption characteristics of a preferred photochromic material for use in the present invention.

So far, the volumes of photochromic materials have been described as blocks or cubes but it should be understood that other shapes may be used in practice of this invention. For instance, as shown in FIG. 7, a volume 141 of photochromic material is curved so an observer may better be able to determine quickly the characteristics of the display in all three dimensions. Any of the display techniques discussed hereinbefore may be utilized with a volume of such a shape. A darkening radiation source is preferably placed on the opposite side of the volume from the observer and a bleaching radiation source is placed to cooperate therewith to form a display.

It should be noted that the depth of the volume 141 is much smaller than its height or width. This reduces the amount of material through which darkening radiation must pass before reaching a preselected location within the volume to be darkened, and thus reduce total attenuation of the darkening radiation beam. Therefore, the intensity of the darkening radiation source is reduced.

It may also be observed that the three-dimensional display system of this invention may also be used to draw displays without the third dimension. For instance, a display could be made in FIG. 7 on the face of the volume of material toward the observer with the radiation forming the display coming from the opposite side of the volume and the remainder of the material in its transparent color state (1). As with the other configurations, bleaching radiation may be employed to both control the attenuation of the darkening radiation and to erase the display when it is desired to draw a new pattern.

In any of the pattern generation configurations outlined hereinabove, it may be necessary to compensate for refraction of radiation which enters the volume of material. For instance, if a narrow collimated beam of darkening radiation is to be directed to a preselected location within the volume, the location chosen for the beam to enter the volume will be determined in part by the refractory characteristics of the volume. To make it easier to scan such a beam between a plurality of distinct preselected locations within the volume, the beam may be caused to enter the volume at a constant angle with a surface thereof so that the beam will be refracted the same amount when directed at each distinct preselected location. It has been found to be the most convenient to direct radiation beams into the volume with all rays within critical portions thereof striking a surface orthogonally. Therefore, the path of these rays are not altered by refraction.

The effect of refraction on a darkening radiation beam must be considered in order to accurately direct such radiation beam to a preselected location within the volume. Referring to FIG. 7A, another shape of the volume of photochromic material is illuted whic takes into account refraction upon a darkening radiation beam. A volume of material 143 has a spherical outside surface 145. A darkening radiation source 147 is pivoted about a point 148 which coincides with the center of curvature of the spherical surface 145. A narrow collimated darkening radiation beam 149 is emitted from the source 147 in a manner to appear to come from the point 148 in order to strike the surface 145 orthogonally at any spot thereon.

A specific photochromic material for use in the practice of this invention is 1', 3', 3'—trimethyl—6—nitrospiro(2H—1—benzopyran—2,2'—indoline), which has a structural formula as follows:

This photochromic material is preferably dissolved at a rate of 10 milligrams per liter of 95 percent ethanol in water. To reduce convection currents, this resulting solution should be gelled, for example by adding approximately 4 percent by weight of polyvinyl acetate. Spectral characteristics of the photochromic material itself are shown in FIG. 8. More information as to this photochromic material may be had by reference to the Journal of the American Chemical Society, vol. 81, p. 5605 (1950).

An examination of the spectral characteristic curves of FIG. 8 illustrates that by choosing radiation wavelength ranges properly, this material may be used in any of the arrangements described hereinabove. A wavelength range including 540 nm.

is preferred for the bleaching radiation $\lambda_1$, used in any of these specific arrangements. It may be noted form the curves of FIG. 8 that this particular photochromic material has a high absorbance of a band of wavelengths including 540 nm. when in its color state (2) relative to other wavelengths. This high absorbance is a desired characteristic as hereinabove discussed with reference to the curves of FIGS. 2A, 3B and 5A which illustrate material of three distinct absorptive characteristics which are used in the various specific display devices described.

A bleaching radiation source, such as the sources 25, 49, 50 and 77, preferably includes a Xenon arc lamp with an appropriate wavelength filter such as a color filter that effectively cuts off all wavelengths below 520 nm. Such a color filter is a Corning glass filter number 3–69.

For the specific devices described hereinabove for using a photochromic material with characteristics illustrated in FIG. 2A, a source of darkening radiation $\lambda_2$ should be in a range of wavelengths including the 365 nm. wavelength marked in FIG. 8. Absorbance of the photochromic material to radiation of this wavelength is much greater in its darkened color state (2) than in its transparent color state (1). The darkening radiation source, such as the source 19, preferably includes a compact mercury arc lamp with a color filter which transmits a band of wavelengths around 365 nm. Such a color filter is a Corning glass filter number 7–37.

For display devices with which a material having characteristics illustrated in FIG. 3B may be used, a source of darkening radiation $\lambda_2$ should be in a range of wavelengths around 300 nm., as marked in FIG. 8, where the absorbance of the material in both color states (1) AND (2) is substantially the same. A source of such radiation preferably includes a compact mercury arc lamp with an interference filter of sufficient bandwidth to pass both the 303 nm. and 313 nm. mercury lines but narrow enough to block other mercury arc radiation, such as the strong lines at 254 nm. and 365 nm.

For the specific display device described in FIG. 5 which works best with a photochromic material having absorptive characteristics illustrated in FIG. 5A, the darkening radiation $\lambda_2$ should include a range of wavelengths about 254 nm., as marked on FIG. 8. An appropriate radiation source has a compact mercury arc lamp with an interference filter having a peak transmission at the 254 nm. mercury line but low transmission at other mercury lines, such as wavelengths 303 nm. and 313 nm. and 365 nm.

Broadly, the embodiment of the present invention so far described has been with respect to materials which exhibit a discernible change of state in response to radiation intensity applied thereto. The specific examples are described which use a photochromic material within the discernible change is visibly discernible and the applied radiation intensity is visible or near visible electromagnetic energy. According to another aspect of the present invention, a volume of material which exhibits a discernible change in radiation state upon a change of temperature is utilized. An example is a thermochromic material which exhibits a discernible change in its optical state with a change in temperature. Preferably, radiant energy is applied to raise the temperature of a predetermined location or locations within the volume of material which is characterized by a threshold temperature above which the material undergoes a discernible change in optical state. The wavelength range of the radiation applied to the thermochromic material has very few limitations, since its only function is to raise the temperature of a preselected location within the volume of thermochromic material. However, the wavelength range should be related to the spectral characteristics of the specific thermochromic material utilized so that it is not excessively attenuated but yet has an attenuation great enough to absorb an amount of electromagnetic energy to produce the heat necessary for the temperature rise which in turn causes an optical change.

One class of thermochromic materials which has been found to operate satisfactorily includes solutions normally transparent at lower temperatures in which a visible phase separation forms when raised above their various threshold temperatures. For most applications, a material is preferred that has a sharp transition temperature from the clear to the opaque state in the neighborhood of a fraction of a degree centigrade so that a sharp and highly localized spot may be formed, and so that the radiation may be scanned rapidly throughout the volume of material to write a desired figure or series of spots.

A further desirable characteristic of the thermochromic material for certain display system applications is that it have a hysteresis effect. That is, the change in optical state with increasing temperature should occur generally at a higher threshold temperature than does the reverse change in optical state with decreasing temperature. For the materials described herein, this means an opaque spot may be formed in a normally clear volume of material at a threshold temperature higher than the temperature at which the spot may be made clear again, thus providing for retention time of the figure drawn.

Many polymer solution operate satisfactorily pipeiidyl a thermochromic material utilized in such a display device, for example, an aqueous solution of nonylphenoxypoly(ethyleneoxy) ethanol. It has been found that smaller transition temperatures from the clear to the precipitate state may be obtained by using a pure material in solution instead of a polymer. A material with a high degree of concentration of molecular weights within a narrow range instead of the wide distribution characteristic of most polymers has a smaller transition temperature spread. One pure thermochromic material which has been found to give good results is 1, 3 di 4-piperidyl propane, which has the following structural formula:

In one specific display system, this preferred thermochromic material is mixed 20 percent by weight with water. To the solution is added 1 percent by weight of polyacrylamide for gelling. If this gelled solution is allowed to sit for one week, it has been observed that the threshold temperature is approximately 25° C. and the transition temperature between the two optical states is approximately 0.2° C.

For some display devices, it may be desired to use a different concentration of the dipiperidyl propane thermochromic material. For instance, a 7 percent aqueous solution with approximately 0.25 percent polyacrylamide added for gelling exhibits a hysteresis effect, thus allowing greater retention time of the spot of figure drawn before returning into a clear optical state.

Figure 9:
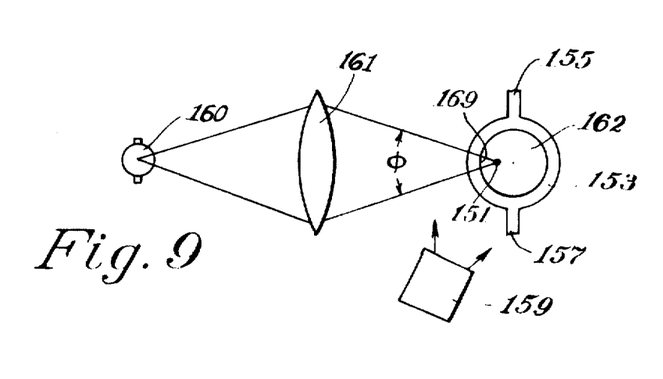
FIG. 9 illustrates an aspect of the present invention utilizing a thermochromic three-dimensional medium.

Referring to FIG. 9, an apparatus for effecting a three-dimensional display with such thermochromic materials is schematically illustrated. A carbon arc light source 160 emits light radiation at substantially a point which is imaged by a lens 161 into a volume of thermochromic material 162 at a spot 151 where a change in optical state is desired. The thermochromic material 162 is held in a suitable container which is surrounded by a water chamber which has an inlet 155 and an outlet 157 to provide a flow of water to carry away excess heat generated within the thermochromic volume.

Either of the above described solutions of thermochromic material have spectral absorptive characteristics similar to water when below their respective threshold temperatures. The water jacket 153 also serves as a radiation filter to eliminate from the thermochromic material 162 those wavelengths which are strongly absorbed by ,2 This filtering technique and the use of a focused radiation beam allows control of the state of the spot 151, whose optical state is changed. The spot 151 is observed to be in a distinct passive optical state from the surrounding material by application of an external light source 159, which may be ambient room light. The properties of light absorption, reflection, refraction, and scattering of the optical state of the spot are discernible form those properties of the optical state of the surrounding regions.

It is an advantage to be able to utilize a single focused radiation beam to form a spot within the volume, as shown in FIG. 9. The lens 161 may be moved relative to the light source 160 to move the focus point within the volume to form other spots or a figure. However, in order to prevent clouding at the surface 169 of the volume of thermochromic material 162 and yet to generate the spot 151, it has been discovered that the radiation cone must have a cone angle $\Phi$ greater than a particular angle which depends in part upon the absorption characteristics of the thermochromic material for the wavelength range of the radiation cone.

The objective is to provide a cone of radiation with intensity density increasing along the cone axis with increasing distance into the volume of material to a maximum density at the cone vertex located where the spot 151 is to be formed. When a cone of radiation exists in nonattenuating medium, this will occur from the nature of a converging radiation beam. But when in an attenuating medium, such as the thermochromic solutions herein, the intensity density along the beam also depends on the attenuating effects of the thermochromic material upon the specific radiation being applied. It has been recognized that the cone angle $\Phi$ may be increased if fogging at the surface 169 occurs without forming the spot 151, until the spot appears and the fogging is eliminated.

It will be understood that the advance in the art of this invention is not limited to the embodiments described in specific examples but that the scope of the invention is defined by the appended claims.

What is claimed is:

1. A three-dimensional pattern generator, comprising:

A volume of material having at least two discernibly different non-radiation emissive states and responsive to radiation intensity within at least two distinct wavelength ranges, wherein said material passes from a first to a second of said states upon application of radiation within a first of said distinct wavelength ranges, and wherein said material passes from the second to the first of said states upon application of radiation within a second of said distinct wavelength ranges, and pattern generation means cooperatively associated with said volume of material for simultaneously applying controlled levels of radiation intensity within the first and second of said distinct wavelength ranges to generate a discernible spot at a preselected location within said volume of material.

2. A three-dimensional pattern generator according to claim 1 which additionally comprises readout radiation means for illuminating the volume of material to detect the nonradiation emissive state of the preselected location within said volume of material.

3. A three-dimensional pattern generator according to claim 2 wherein said pattern generation means includes means for bringing radiation within said first wavelength range to a focus at said preselected location within said volume of material.

4. A three-dimensional pattern generator according to claim 3 wherein the pattern generation means additionally includes means for flooding with radiation of said second distinct wavelength range at least regions within the volume of material through which said radiation beam of the first wavelength range passes before reaching said preselected location.

5. A pattern generator according to claim 4 wherein the pattern generation means additionally includes means for scanning said radiation of first and second wavelength ranges throughout the volume of material to form a succession of discernible spots.

6. A three-dimensional pattern generator according to claim 1 wherein said pattern generation means includes means to form and direct a beam of radiation within said first wavelength range to said preselected location within said volume of material.

7. A three-dimensional pattern generator according to claim 6 wherein said beam within said first wavelength range is focused to its maximum intensity at said preselected location within said volume of material.

8. A three-dimensional pattern generator according to claim 6 wherein said pattern generation means additionally includes means for flooding with radiation of said second wavelength range at least portions of said volume of material through which said beam within said first wavelength range passes before reaching said predetermined location.

9. A three-dimensional pattern generator according to claim 8 wherein said volume of material is further characterized by radiation absorption of said first wavelength range, which absorption is substantially greater in said material's second state than in said material's first state.

10. A three-dimensional pattern generator according to claim 8 wherein said volume of material is further characterized by radiation absorption of said first wavelength range, which absorption is substantially the same in said material's second state as in said material's first state.

11. A three-dimensional pattern generator according to claim 1 wherein said material has at least two discernibly different states, said states being at least two discernibly different optical states.

12. A three-dimensional pattern generator according to claim 11 wherein said radiation intensity includes electromagnetic radiation intensity.

13. A three-dimensional pattern generator according to claim 4 wherein said volume of material having at least two discernibly different states includes a volume of material having at least two discernibly different optical states.

14. A three-dimensional pattern generator according to claim 8 wherein said volume of material has at least two discernibly different states said states being at least two discernible optical states.

15. A three-dimensional pattern generator according to claim 1 wherein said volume of material includes a volume of photoreversible photochromic material.

16. A three-dimensional pattern generator according to claim 15 wherein said first state is substantially optically clear.

17. A three-dimensional display system, comprising:

a volume of photoreversible photochromic material having at least two discernibly different optical states wherein said material may be caused to pass from a substantially clear optical state to a darkened optical state by application of darkening optical electromagnetic radiation within a first range of wavelengths, and wherein said material may be caused to pass from a darkened optical state to a substantially clear optical state by application of bleaching optical electromagnetic radiation within a second distinct band of wavelengths, and display means cooperatively associated with said volume of material for simultaneously applying to said volume radiation intensity of both darkening and bleaching radiation to generate a darkened spot at a preselected location within said volume.

18. A three-dimensional display system according to claim 17 wherein said display means includes means to form and direct said darkening radiation in a beam to said preselected location within said volume of material.

19. A three-dimensional display system according to claim 18 wherein said display means additionally includes means to bring said beam of darkening radiation to a focus of maximum intensity at said preselected location.

20. A three-dimensional display system according to claim 18 wherein said display means additionally includes means for flooding with bleaching radiation at least that portion of the volume of material through which said beam of darkening radiation passes prior to reaching said preselected location.

21. A three-dimensional display system according to claim 20 wherein said volume of material exhibits greater absorption of the darkening radiation in said material's darkened optical state than in said material's clear optical state.

22. A three-dimensional display system according to clam 20 wherein said display means additionally includes means to bring said beam of darkening radiation to a focus of maximum intensity at said perselected location, and wherein said volume of material exhibits substantially the same radiation absorption to the darkening radiation in the material's darkened optical state than in said material's clear optical state.

23. A three-dimensional display system according to claim 20 wherein said display means includes additional means for flooding with bleaching radiation in regions beyond said preselected location through which said beam of darkening radiation passes.

24. A three-dimensional display system according to claim 20 wherein said volume of material exhibits at least twice the absorption of darkening radiation in said material's darkened optical state than in said material's clear optical state.

25. A three-dimensional display system according to claim 21 wherein said volume of material additionally exhibits to bleaching radiation substantially greater absorption in said material's darkened optical state than in said material's substantially clear optical state.

26. A three-dimensional display system according to claim 17 wherein said display means includes means to focus said darkening radiation at said preselected location in a beam whose cross section is less in one direction than another direction approximately orthogonal thereto, and which further includes means for directing said bleaching radiation in the portions of said volume of material through which said darkening beam passes prior to reaching said preselected location in a manner to pass through said darkening radiation beam in said less cross-sectional dimension.

27. A three-dimensional display system according to claim 17 wherein said volume is shaped with at least one curved surface oriented in a manner that the display to be viewed by an observer is presented through this curved surface.

28. A three-dimensional display system according to claim 20 wherein said volume of material is substantially thinner in one dimension than in the other two dimensions and wherein said display means directs darkening radiation into the volume along a line passing through the thin dimension of said volume.

29. A three-dimensional display system according to claim 17 wherein said display means includes;
means for flooding bleaching radiation through something less than the full volume of material in a beam with sharp intensity cut off on at least one surface thereof, and
means for directing a beam of darkening radiation through that portion of the volume of material flooded by said bleaching radiation flooding means to intersect with a surface of said bleaching radiation beam at which there is a sharp intensity cut off from within the beam, thereby forming a darkened spot at said intersection.

30. A three-dimensional display system according to claim 29 which additionally comprises means for scanning said bleaching radiation beam and said darkening radiation beam cooperatively through the volume of material to form a series of darkened spots at a series of preselected locations.

31. A three-dimensional display system according to claim 30 wherein said volume of photochromic material exhibits greater radiation absorption of said darkening radiation in said material's darkened optical state than in said material's clear optical state.

32. A three-dimensional display system according to claim 18 wherein said volume of material has at least one spherical surface and wherein said means to form and direct said darkening radiation additionally includes means for directing a narrow collimated darkening radiation beam into said volume of material through said spherical surface, said means for directing being rotatable about the spherical surface's center of curvature.

33. A three-dimensional display system according to claim 18 wherein said means to form and direct said darkening radiation includes means for restricting the entry to said radiation into said volume through a surface thereof in a manner so that the beam's axis is orthogonal with said surface.

34. A three-dimensional display system a according to claim 20 wherein said display means additionally includes means for flooding the entire volume with bleaching radiation of an intensity sufficient to bleach any prior display before forming a new display.

35. A three-dimensional display system, comprising,
a volume of photoreversible photochromic material having at least two discernibly different optical states wherein said material may be caused to pass from a substantially clear optical state to a darkened optical state by application of darkening optical electromagnetic radiation within a first range of wavelengths, and wherein said material may be caused to pass from a darkened optical state to a substantially clear optical state by application of bleaching optical electromagnetic radiation within a second distinct band of wavelengths, and
display means cooperatively associated with said volume of material for simultaneously applying to said volume radiation intensity of both darkening and bleaching radiation to generate darkened spots in at least two preselected locations within said volume.

36. A three-dimensional display system according to claim 35 wherein said display means includes means to form and direct simultaneously said darkening radiation in at least two beams to said at least two preselected locations within said volume of material.

37. A three-dimensional display system according to claim 35 wherein said display means additionally includes means for flooding with bleaching radiation at least those portions of the volume of material through which said at least two beams of darkening radiation pass prior to reaching said preselected locations.

38. A method of generating a three-dimensional pattern within a volume of photoreversible photochromic material which may be caused to pass from a substantially clear optical state to a darkened optical state upon the application of darkening radiation and also which may be caused to pass from the darkened optical state into a substantially clear optical state by application of bleaching radiation, comprising the steps of:
scanning a bleaching radiation beam having a sharp intensity cut off at its trailing edge through at least a portion of said volume of material, and
passing a darkening radiation beam through the volume of material flooded with the bleaching radiation beam to the trailing edge thereof, whereby darkened spots may be successively formed in various preselected locations within said volume where the darkening radiation beam intersects with the trailing edge of the bleaching radiation beam.

39. A method according to claim 38 wherein the step of passing a darkening radiation beam includes passing a narrow collimated darkening radiation beam through the volume of material flooded with the bleaching radiation beam to the trailing edge thereof.

40. A method according to claim 38 wherein the step of passing a darkening radiation beam includes the step of passing a darkening radiation beam which is focused to its maximum intensity at the intersection with the trailing edge of said bleaching radiation beam.

41. A three-dimensional pattern generator, comprising;
a volume of thermochromic material optically responsive to a rise in temperature and characterized by substantial optical clarity below a threshold temperature of said material, and
means for raising said material's temperature above said threshold level to cause a discernible optical change at a spot, including means for focusing a beam of electromagnetic radiation at said spot to an intensity that is a maximum within said volume of material.

42. A three-dimensional pattern generator according to claim 41, wherein said thermochromic material exhibits a change in phase at said spot when said spot is raised from below to above said threshold temperature.

43. A three-dimensional pattern generator according to claim 41 wherein said thermochromic material is additionally responsive to the lowering of temperature to return to its substantially clear state at a temperature lower than said threshold temperature.